(No Model.)
T. McFEELY.
Device for Arresting, Storing and Transmitting Motion.
No. 240,744. Patented April 26, 1881.
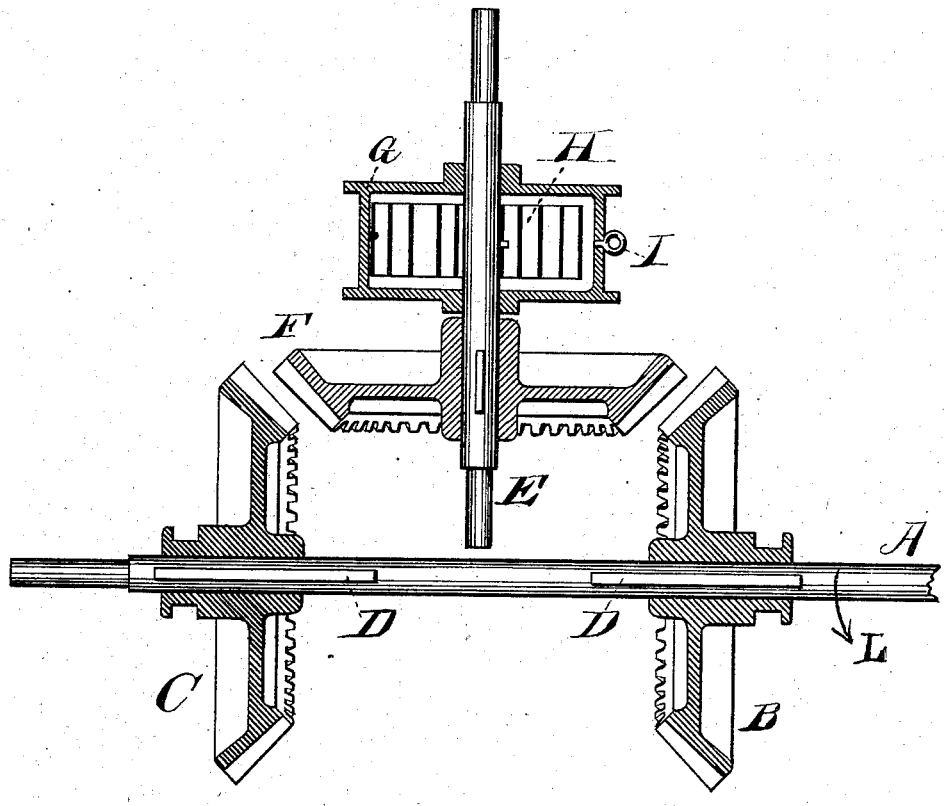
WITNESSES:
John Lorenz
Jno. R. Woods
Thomas McFeely INVENTOR
by James W. See
ATTORNEY

UNITED STATES PATENT OFFICE.

THOMAS McFEELY, OF GEORGETOWN, DISTRICT OF COLUMBIA.

DEVICE FOR ARRESTING, STORING, AND TRANSMITTING MOTION.

SPECIFICATION forming part of Letters Patent No. 240,744, dated April 26, 1881.

Application filed March 15, 1881. (No model.)

*To all whom it may concern:*

Be it known that I, THOMAS MCFEELY, of Georgetown, District of Columbia, have invented certain new and useful Improvements in Devices for Arresting, Storing, and Imparting Motion, of which the following is a specification.

The figure represents a sectional view.

In the accompanying drawing, A is a shaft adapted to form one of the rotary pieces of any machine which requires to be occasionally stopped and started. The object of the device is to utilize, in stopping, the momentum of the machine, and to impart this stored force when it is desired to start the machine.

B and C are bevel-gears, fitted to slide freely on the shaft A, and caused to rotate with the shaft by the feathers D. Any proper device for sliding the gears can be used. Let the normal direction of the shaft's rotation be indicated by the arrow L, the top of the shaft moving toward the spectator.

E is a shaft placed at right angles to the shaft A. On it is fixed the bevel-gear F, adapted to mesh with either or both of the bevel-gears B C. If the gear B be set to mesh with the gear F, the shaft A will, during its normal motion, obviously tend to revolve the top of the shaft E to the left. Were the gear F driven by the gear C, the direction of motion imposed upon the shaft E would be opposite to that just indicated. If the gears B and C both engage with the gear F, the device will be locked, and no motion of any part can take place. The gears may be toothed, or they may have friction-surfaces, and instead of the gears moving in and out of mesh they may be continually in gear, if they are fitted to revolve loosely on the shaft A, and well-known clutching devices used to lock one gear or both to the shaft A for the time being. The rotation of the shaft E or gear F is resisted by the spring H, arranged as is usual with springs for resisting rotary motion.

Instead of a spring attached directly to the shaft E, the spring-case G may act as a winding-drum, and by means of the hitch device I may wind up a cord or chain or metallic ribbon attached to a spring or weight. In such case the drum G should be fitted to revolve with the gear G.

The operation of the device is as follows:

The shaft A revolving normally, it is desired to stop it, store its momentum, and utilize this stored force as an aid in starting again. While the shaft A revolves the motive power is to be cut off or suppressed. The gear B is to be moved into gear with gear F. Shaft A, still revolving by momentum, revolves gear F and winds up the resisting medium until motion ceases. Gear C is then moved to mesh with gear F, and the device is locked against all motion. In order to start, the gear B is disengaged, and the motive power is applied to the machine. The resisting medium tends to revolve the gear F in a direction opposite to the direction it was formerly forced to revolve in. The gear B is disengaged, and the energy of the resisting medium is given out in urging the gear C and shaft to revolve in the normal direction. When the energy of the resisting medium is exhausted the gear C is to be disengaged and the parts left in normal condition. The resisting medium is preferably a spring, as in such case its energy will be the greatest at the point where most needed—that is, when it is first applied to aid in starting the shaft A. Numerous plans of attaching the resisting medium to the gear G will suggest themselves.

The remarkable simplicity and efficiency of the device will be at once apparent.

I claim as my invention—

1. The combination of a main shaft, two bevel-gears feathered upon said shaft, and adapted to be thrown in and out of action, a third bevel-gear, adapted to be acted upon or engaged with either or both the bevel-gears upon said main shaft, and a resisting medium attached to said third bevel-gear, substantially as and for the purpose specified.

2. The combination of a main shaft, two bevel-gears feathered to said shaft, a cross-shaft properly supported in bearings, a third bevel-gear on said cross-shaft, adapted to gear with either or both of said main-shaft gears, and a resisting medium attached to said third bevel-gear, substantially as and for the purpose specified.

THOS. McFEELY.

Witnesses:
J. C. BROWN,
THOMAS K. WALLACE.